Oct. 28, 1924.

W. E. CLAYTON 1,513,157

DOUGH DIVIDING MACHINE

Filed June 14, 1923     3 Sheets-Sheet 1

W. E. Clayton
INVENTOR

BY Victor J. Evans
ATTORNEY

WITNESS:

Oct. 28, 1924.
W. E. CLAYTON
1,513,157
DOUGH DIVIDING MACHINE
Filed June 14, 1923
3 Sheets-Sheet 2
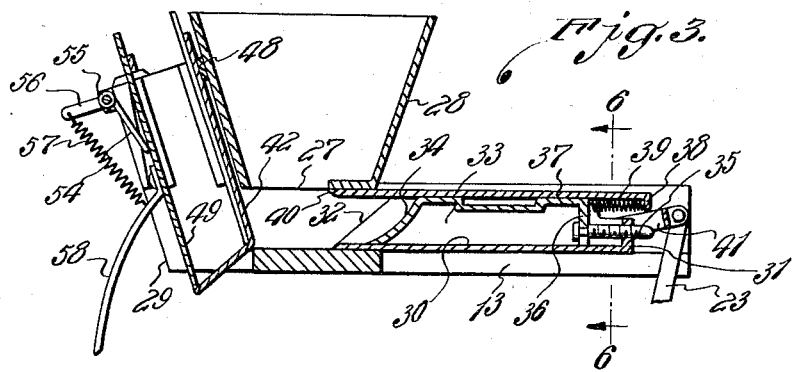
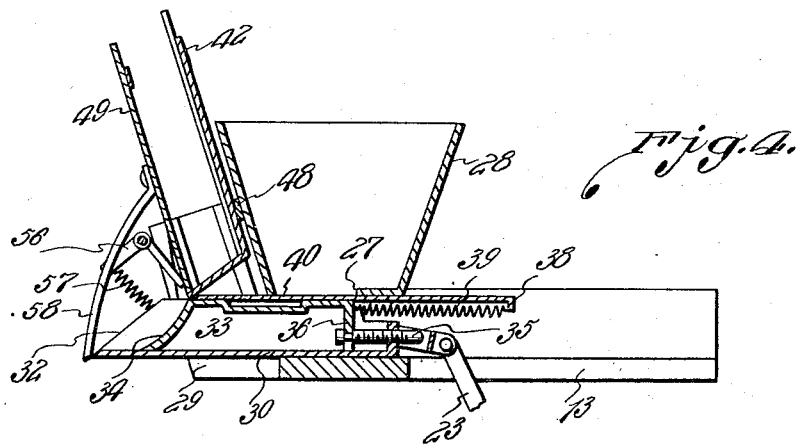
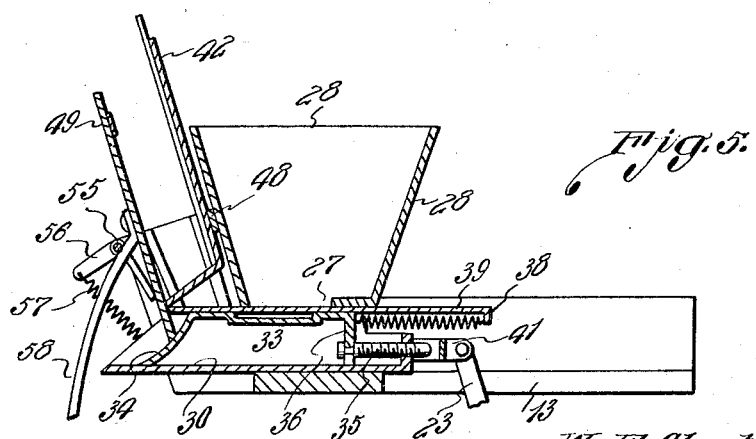

Oct. 28, 1924.
W. E. CLAYTON
1,513,157
DOUGH DIVIDING MACHINE
Filed June 14, 1923     3 Sheets-Sheet 3
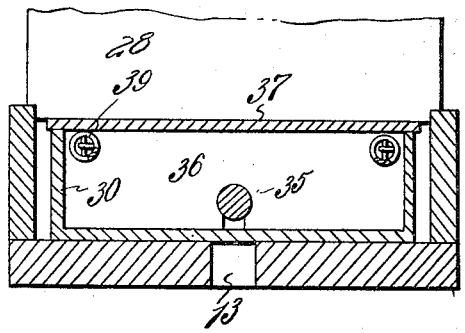
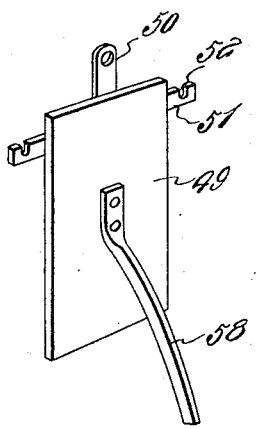
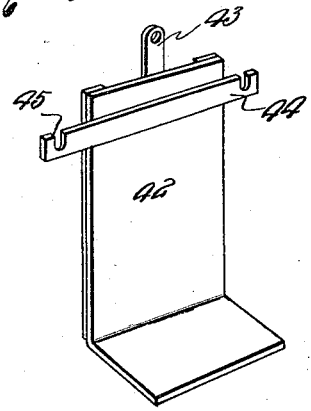
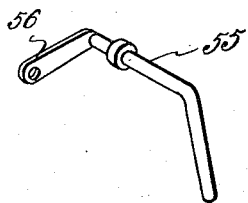

Patented Oct. 28, 1924.

1,513,157

UNITED STATES PATENT OFFICE.

WILLIAM E. CLAYTON, OF ALTOONA, KANSAS.

DOUGH-DIVIDING MACHINE.

Application filed June 14, 1923. Serial No. 645,385.

*To all whom it may concern:*

Be it known that I, WILLIAM E. CLAYTON, a citizen of the United States, residing at Altoona, in the county of Wilson and State of Kansas, have invented new and useful Improvements in Dough-Dividing Machines, of which the following is a specification.

This invention relates to apparatus for use by bakers and has for its object the provision of a novel machine for dividing a mass of dough into lumps of sufficient size to form loaves, rolls and the like.

An important object is the provision of a machine of this character which is power driven and which operates automatically to cut the dough into lumps of any desired size, all of which will be uniform, the device being naturally a great saver of time and labor in its operation.

A more specific object is the provision of a device of this character which includes a reciprocatory plunger operating to cut the dough into sections or lumps, the plunger having co-acting therewith a kicking means for discharging the lumps and also equipped with a scraper which will operate to clean the main plunger at each stroke.

An additional object is the provision of a machine for this purpose which will be simple and inexpensive in manufacture, easy to operate and control, positive in action, efficient and durable in service and a general improvement in the art.

With the above and other objects and advantages in view the invention consists in the details of construction to be hereinafter more fully described and claimed and illustrated in the accompanying drawings, in which:

Figure 1:
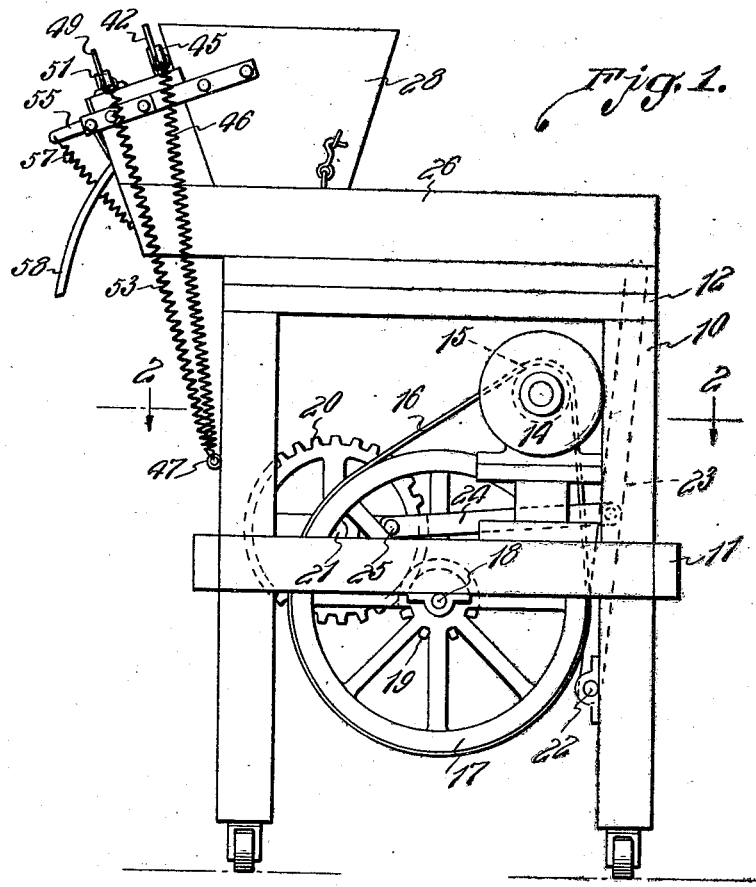
Figure 1 is a side elevation of the device.
Figure 2:
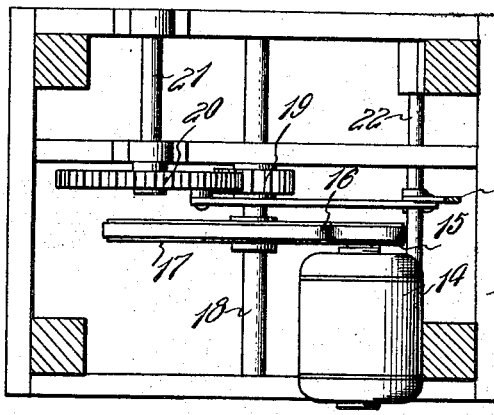
Figure 2 is a horizontal section on the line 2—2 of Figure 1.

Figure 3 is a longitudinal section through the main portion of the device showing the plunger at one limit of its movement, Figure 4 is a similar view showing the plunger at the other limit of its movement, Figure 5 is a similar view showing the plunger as starting on its return stroke, Figure 6 is a detail cross section on the line 6—6 of Figure 3, Figure 7 is a perspective view of the scraper blade, Figure 8 is a detail perspective view of the discharge member and Figure 9 is a perspective view of the arm holding the scraper member.

Referring more particularly to the drawings I have shown my device as comprising an upstanding supporting frame including legs 10 connected by any necessary or preferred number of cross bars 11 and carrying a table 12 formed with a longitudinal slot 13. Suitably mounted within the frame is an electric motor 14 operating to drive a pulley 15 about which is trained a belt 16 which is in turn trained about a pulley 17 on a shaft 18 journaled in the frame. On the shaft 18 is a pinion 19 meshing with a gear 20 on a counter-shaft 21. Pivoted at 22 upon the frame is a rocker arm 23 with which is pivotally connected a pitman 24 which is in turn carried by a wrist pin 25 on the gear 20. By this means the rocker arm 23 is swung back and forth in the slot 13.

Mounted upon the table is an elongated casing 26 which is open at both ends and which has its top formed with an opening 27 above which is located a hopper 28 into which is fed the dough to be divided or cut into loaves. The casing 26 over hangs the table, this overhanging portion 29 being opened and constituting the discharge opening for the lumps of dough.

Slidable within this casing 26 is a plunger which includes a trough like member 30 which is U-shaped in cross section and which has one end formed with an upstanding flange 31 and which has the forward ends of its side edges inclined as shown at 32. Mounted within this member 30 is a longitudinally adjustable filler 33 which is of inverted U-shape in cross section and which fits snugly within the member 30. The forward end of this filler member is concaved as indicated at 34 to form a pocket into which dough may be formed. The size of the pocket is varied by adjusting the position of the filler, the adjustment being effected by turning a screw 35 which is swivelly connected with a downturned flange 36 on the rear end of the filler and which is threaded through the valve 31, the projecting free end of this screw being formed angular in cross section for engagement by a suitable wrench or other tool. The plunger also includes an elongated blade 37 having its rear end formed with a downturned flange 38 connected with the flange 36 by a spring 39. The forward edge of this blade is sharpened as indicated at 40 and the blade operates beneath the opening 27 for cutting off the dough falling therethrough from the hopper. Pivotally connected with the rear end of the plunger is a link 41 to which is connected the upper end of the rocker arm 23 so that when the motor is operated the plunger will be reciprocated.

Slidably mounted against the forward side of the hopper is a discharge member 42 provided for the purpose of forcing the dough out of the pocket and this member is here illustrated as being a substantially L-shaped plate provided at its top with an apertured ear 43 and carrying a transverse strip 44 projecting beyond its side, the projecting ends of the strip being notched as indicated at 45 for engagements by springs 46 which extend downwardly and which are secured to the frame as indicated at 47, the purpose of the springs being to normally urge this discharge member into its lowermost position. The downward movement of the member is limited by engagement with the edge of the opening 29. It is of course apparent that suitable guides 48 must be provided for this discharge member.

Also slidable between the guides is a scraper plate 49 formed at its top with an upstanding apertured ear 50 and provided on its face with a transverse strip 51 projecting beyond its edges, the projecting ends of the strip being formed with notches 52 for engagement therein of coil springs 53 which extend downwardly and which are connected with the frame at the points 47. Downward movement of this scraper blade or plate is limited by engagement with the lower edge of the member 42 but the mounting of this scraper is such that it may be tilted so as not to engage the member 42. However, the blade 49 normally engages the member 42 and is held in such position by an arm 54 carried by a shaft 55 journaled in suitable bearings and carrying an arm 56 with which is connected a spring 57 which is in turn connected with some stationary element of the mechanism. The engagement of the arm 54 with the plate 49 holds it in such position that its lower edge will rest upon the inclined lower portion of the discharge member 42, but to effect release of such engagement, I provide the blade or plate 49 with an arm 58 which extends in the path of travel of the reciprocatory plunger.

In the operation dough is placed within the hopper and the motor is set in operation. Assuming that the plunger formed by the parts 30, 33 and 37 is at the retracted position as shown in Figure 3, it will be apparent that when the mechanism drives the rocker arm 23 to advance the plunger, the edge 40 of the blade 37 passing beneath the open bottom of the hopper will cut off a section of dough, which lump or section will be engaged within the pocket at the forward end of the plunger. As the movement of the plunger continues the forward end thereof engages beneath the angle at the bottom of the discharge member 42 and consequently slides the discharge member upwardly, the inclined edges 32 of the plunger riding beneath and supporting the discharge member. When this is done the springs 46 are placed under tension. As the discharge member is elevated, the plate 49 is carried with it and when the plunger strikes against the arm 58, the plate 49 is tilted sufficiently that it will slip off from the member 42 and will be drawn downwardly by the action of the spring 53. The lower edge of the plate 49 then bears upon the curved forward wall 34 of the plunger and scrapes off the lump or section of dough thereon as the plunger is retracted. This is the complete cycle of operation and is repeated as long as the motor is in operation and dough is supplied to the hopper.

From the foregoing description and a study of the drawings it will be apparent that I have thus provided a simply constructed and consequently inexpensive device which will rapidly, conveniently, economically and successfully divide dough into lumps of suitable size for forming loaves. The device is bound to be a great time and labor saver and will do uniform work.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In a machine of the character described, a supporting table, a casing mounted thereon, a hopper having its bottom communicating with said casing, a plunger mounted for reciprocation within said casing and beneath said hopper, means for reciprocating the plunger, the support being provided at one end with a discharge opening, and a vertically movable discharge member located above said discharge opening and spring pressed in one direction, said discharge member being engageable by the plunger whereby to be lifted.

2. In a machine of the character described, a supporting table, a casing mounted thereon, a hopper having its bottom communicating with said casing, a plunger mounted for reciprocation within said casing and beneath said hopper, means for reciprocating the plunger, the support being provided at one end with a discharge opening, and a vertically movable discharge member located above said discharge opening and spring pressed in one direction, said discharge member being engageable by the plunger whereby to be lifted, a vertically movably mounted scraper plate, and means operated by engagement of the plunger for releasing said scraper plate whereby the latter will scrape over the forward end of the plunger.

3. In a device of the character described, a casing having a discharge opening, a hopper on the casing communicating therewith, a plunger mounted for reciprocation within the casing and having an inclined forward end, an adjustable member within the plunger defining a dough receiving pocket, the plunger further including a blade operating beneath the hopper, a discharge member slidably mounted adjacent the hopper above the discharge opening and operated by engagement of the plunger therewith, a scraper plate normally engaged upon a portion of the discharge member, and an arm carried by said plate engageable by the plunger for disengaging the plate from the discharge member whereby the former will slide along the forward end of the plunger to scrape off a lump of dough thereon.

In testimony whereof I affix my signature.

WILLIAM E. CLAYTON.